United States Patent
Hamidian et al.

(10) Patent No.: US 7,462,995 B2
(45) Date of Patent: Dec. 9, 2008

(54) TRANSISTORIZED, VOLTAGE-CONTROLLED DIMMING CIRCUIT

(75) Inventors: Jalil Phil Hamidian, Irvine, CA (US); Andrei Grombchevsky, Laguna Niguel, CA (US); Edwin J. Yagerlener, Costa Mesa, CA (US)

(73) Assignee: StacoSwitch, Inc., Costa Mesa, CA (US)

( * ) Notice: Subject to any disclaimer, the term of this patent is extended or adjusted under 35 U.S.C. 154(b) by 597 days.

(21) Appl. No.: 11/100,101

(22) Filed: Apr. 5, 2005

(65) Prior Publication Data

US 2005/0280376 A1    Dec. 22, 2005

Related U.S. Application Data

(60) Provisional application No. 60/560,130, filed on Apr. 6, 2004.

(51) Int. Cl.
     *G05F 1/00*       (2006.01)
     *H05B 41/36*     (2006.01)

(52) U.S. Cl. .................. 315/308; 315/310; 315/209 R; 315/119

(58) Field of Classification Search ................. 315/308, 315/119–120, 123–125, 127–128, 136, 224, 315/241 R, 300, 302, 306, 311, 209 R, 291, 315/3, DIG. 4; 362/800, 249, 250–251, 252
See application file for complete search history.

(56) References Cited

U.S. PATENT DOCUMENTS

| | | | |
|---|---|---|---|
| 4,029,991 A | 6/1977 | Schultz | |
| 4,182,977 A | 1/1980 | Stricklin, Jr. | |
| 4,211,955 A | 7/1980 | Ray | |
| 5,459,478 A | 10/1995 | Bolger et al. | |
| 5,604,708 A * | 2/1997 | Helms et al. ................. | 365/229 |
| 5,929,568 A | 7/1999 | Eggers | |
| 6,075,448 A * | 6/2000 | Verkhovskiy ............... | 340/657 |
| 6,323,598 B1 | 11/2001 | Guthrie et al. | |
| 6,489,728 B2 | 12/2002 | Guthrie et al. | |
| 6,653,798 B2 | 11/2003 | Guthrie et al. | |
| 6,670,776 B2 | 12/2003 | Guthrie et al. | |
| 6,683,419 B2 | 1/2004 | Kriparos | |
| 6,737,814 B2 | 5/2004 | Guthrie et al. | |
| 6,828,814 B2 * | 12/2004 | Gergintschew .............. | 324/765 |
| 6,844,681 B2 * | 1/2005 | Serizawa et al. ............... | 315/77 |
| 6,940,416 B2 * | 9/2005 | Hudson et al. .............. | 340/663 |
| 6,974,945 B2 * | 12/2005 | Matsuo et al. .......... | 250/214 R |

OTHER PUBLICATIONS

Paul Greenland and Werner Bernsns, Powering Next-Generation Solid State Lighting, Power Electronics Technology, May 2004, Santa Clara, California and Fuerstenfeldbruck, Germany; article was found online at powerelectronics.com.

* cited by examiner

*Primary Examiner*—David Hung Vu
*Assistant Examiner*—Minh Dieu A
(74) *Attorney, Agent, or Firm*—Shimokaji and Associates P.C.

(57) ABSTRACT

A system includes a switching transistor that provides a current source to a load when activated by an input voltage and at least one Zener diode connected in parallel with the load that acts as a shunt regulator. The system may be especially suited for matching the controlled luminance of light emitting diodes to the controlled luminance of incandescent lighting. The system may also be useful for displays where a single master voltage regulator switch or controller controls the different types of lighting. The system may be packaged in a chip scale package for compactness, reduced weight, cost effectiveness, and higher efficiency and reliability.

23 Claims, 4 Drawing Sheets

TRANSISTORIZED, VOLTAGE-CONTROLLED DIMMING CIRCUIT

CROSS-REFERENCE TO RELATED APPLICATIONS

This application claims the benefit of U.S. Provisional Patent Application No. 60/560,130, filed on Apr. 6, 2004.

BACKGROUND OF THE INVENTION

The present invention generally relates to electronic power regulation and, more particularly, to voltage-controlled lamp dimming and luminance matching of light emitting diodes (LED) to incandescent bulbs.

While incandescent bulbs are widely known for many lighting applications, there are many uses for which the use of light emitting diodes provides significant advantages due, for example, to the greater durability, cost effectiveness, longer life, reliability, and light generating efficiency along with the lower heat generation and power consumption of LEDs in comparison with incandescent lights. LEDs have been found to be particularly useful, for example, in aircraft cockpits and automobile dashboards for such applications as illuminated switches, lighted control panels, displays, legends, and indicators. Control panels for aircraft and other vehicles often provide a control dimming switch that allows the pilot or driver to manually dim the display, for example, to match night vision conditions or to otherwise adjust the display visibility, e.g., for personal preference.

For a display having both incandescent and LED illumination, consistent dimming of the entire display from a single controller switch may be achieved if each of the lights has similar brightness characteristics. The luminance, or brightness, level of LEDs is different, however, from that of incandescent lights given the same input voltage or input current. Therefore, to provide consistent dimming from a single control dimming switch requires some form of input power (either voltage or current) compensation among the different types of lighting used for the display. Even for displays in which all incandescent lighting has been replaced by LEDs or for newly designed displays with all LED illumination, it may be desirable for the response of the control dimming switch to mimic that of the familiar incandescent lit display by using some form of compensation to match the luminance characteristics of LEDs to those of incandescent lighting. For example, the unintentional emission of light by LEDs can be a problem, since LEDs—unlike incandescent lamps—have the potential to produce detectable levels of illumination with as little as a few microamperes of current. Since some electronic devices—such as aircraft avionic equipment coupled to aircraft control panel display elements—have inherent current at levels at least that high, the display elements may be unintentionally illuminated. By compensating the input power to LEDs, the low power level characteristics of incandescent light (e.g., requiring a minimum positive power input before illumination is detectable) could be mimicked so that unintentional control panel illumination is avoided.

As can be seen, there is a need for input power compensation for luminance matching for different types of lighting. There is also a need for consistent dimming of different types of lighting from a single control dimming switch. Moreover, there is a need for luminance compensation for LEDs that avoids unintentional illumination of the LEDs.

SUMMARY OF THE INVENTION

In one embodiment of the present invention, a system includes a switching transistor that provides a current source to a load when activated by an input voltage and at least one Zener diode connected in parallel with the load that acts as a shunt regulator.

In another embodiment of the present invention, a voltage-controlled power regulation circuit includes a switching transistor activated by an input voltage and a pair of Zener diodes connected (in series) to the emitter of the switching transistor so that the switching transistor provides an output current to a load, and the Zener diodes regulate the current to the load.

In still another embodiment of the present invention, a voltage-controlled luminance matching circuit includes an input port having a positive input port and a negative input port; an output port having a positive output port and a negative output port; at least one diode transistor, having a base and a collector with the base connected to the collector, and connected between the positive input port and the positive output port. A switching transistor is connected between the positive input port and the positive output port. A Zener diode is connected between the positive input port and the base of the switching transistor. At least one Zener diode is connected at the positive output port so as to be connected between the positive output port and both the negative output port and negative input port.

In yet another embodiment of the present invention, a chip scale package includes an input port pin; an output port pin; and a switching transistor. The input port pin is connected to apply a first voltage to the collector of the switching transistor when an input voltage $V_{IN}$ is applied at the input port pin. The input port pin is also connected to provide a base current to the base of the switching transistor when the input voltage $V_{IN}$ is applied at the input port pin; and the emitter of the switching transistor is connected to the output port pin. At least one Zener diode is connected at the output port pin as a shunt regulator in parallel with a load connected externally to the chip scale package at the output port pin.

In a further embodiment of the present invention, a method includes operations of: applying an input voltage to a switching transistor connected as a current source to a load; and shunting excess current through a Zener diode connected as a shunt regulator in parallel with the load.

In a still further embodiment of the present invention, a method for voltage-controlled power regulation includes operations of: applying an input voltage $V_{IN}$ so that a first voltage is applied at the collector of a switching transistor; and applying the input voltage $V_{IN}$ so that a base current is supplied to the base of the switching transistor. The switching transistor then provides an emitter current to a circuit node E. Excess current is shunted from the circuit node E through at least one Zener diode; and current is provided from the circuit node E to a load.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides voltage-controlled power regulation for an electrical load such as a specific light source, which may comprise, for example, a light emitting diode (LED) or an array of LEDs connected in series or in any appropriate configuration as desired. One embodiment may be particularly useful for illuminating switches or switch indicators with LEDs in control panels such as automobile dashboards, control panels of power generating stations, or aircraft cockpits. One embodiment may provide input power compensation for luminance matching for different types of lighting. For example, the voltage-controlled power regulation may be suitably configured for luminance matching of LEDs to incandescent lights and may provide consistent dimming of different types of instrument panel lighting from a control dimming switch, operated manually, for example, or from a single master control dimming circuitry operated automatically. One embodiment may be implemented in a chip scale package (CSP) useful for dimming, e.g., changing the light output in response to changes in input voltage, of illuminated control panel displays, illuminated control panel switches, and indicators. In addition, one embodiment may provide luminance compensation for LEDs that avoids unintentional illumination of the LEDs, in effect mimicking the characteristics of incandescent illumination at low power levels.

One embodiment differs, for example, from prior art dimming and luminance compensation that use only passive circuit elements (e.g., circuit elements with two terminals)—such as resistors and Zener diodes—by using an active circuit element (e.g., circuit elements with three terminals), i.e., a transistor, to effectively provide a current source that can supply a range of output current values at each particular value of output voltage. Because the resistance of a load can vary, for example, with operating temperature, one embodiment can provide better luminance matching since any required current within a range of currents can be supplied by the transistor at the required particular voltage, in contrast to prior art luminance matching using only passive circuit elements—such as Zener diodes and resistors—where changes in load resistance may affect the values both of current and voltage supplied to the load. Thus, the luminance matching provided by one embodiment can be much more accurate and dependable than prior art luminance matching. Moreover, one embodiment uses at least one Zener diode (e.g., Zener diodes D3z 134 and D2z 136, see FIG. 1), which may act as a shunt regulator that regulates the applied current (e.g., output current $I_L$ 102, see FIG. 1) into the load, the shunt Zener diode being connected in parallel with the load. Such a circuit configuration is contrary to prior art circuits that connect Zener diodes only in series with the load and prior art circuits that connect only forward biased current diodes—not reverse biased Zener diodes—in parallel with the load.

Figure 1:
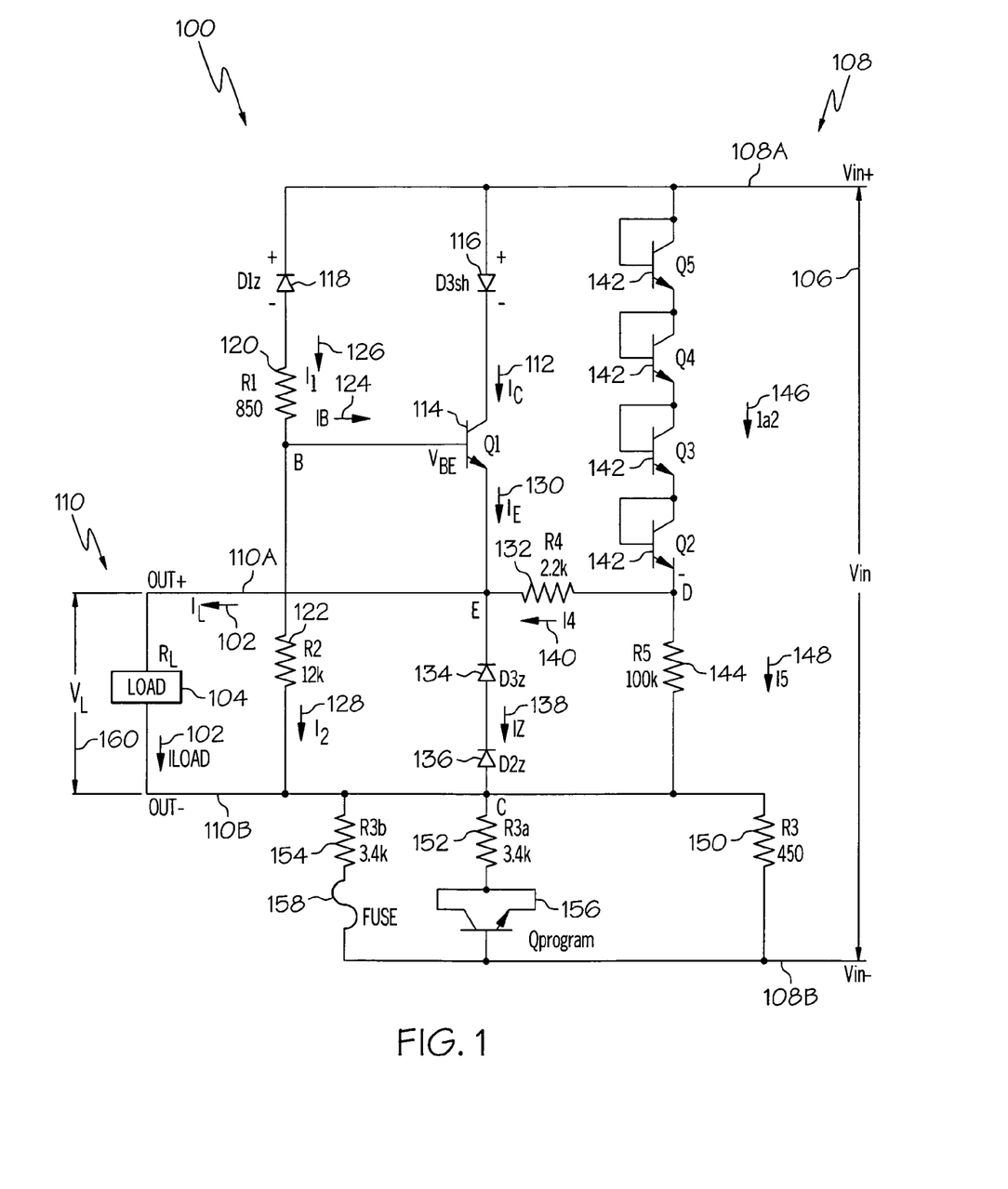
FIG. 1 is a circuit diagram of a transistorized, voltage-controlled dimming circuit in accordance with one embodiment of the present invention.
Figure 2A:
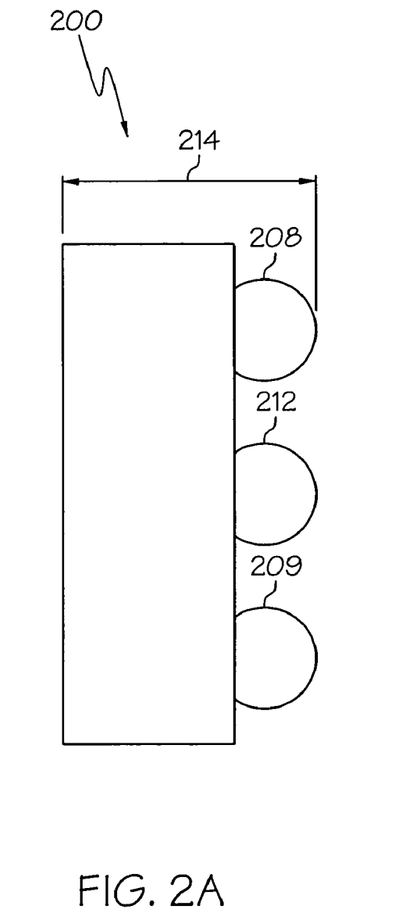
FIGS. 2A and 2B presents side and bottom orthographic views of a chip scale package for a transistorized, voltage-controlled dimming circuit according to one embodiment of the present invention.
Figure 2B:
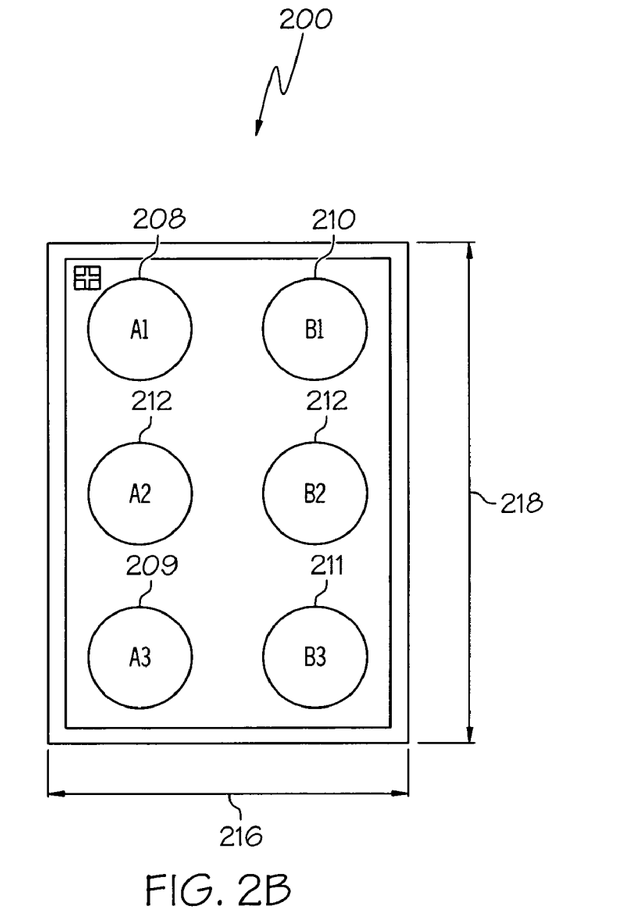

Referring now to the figures, FIG. 1 illustrates system 100 for controlling the output current $I_L$ (or $I_{LOAD}$) 102 to a load 104 according to the input voltage $V_{IN}$ 106, in accordance with one embodiment of the present invention. Input voltage $V_{IN}$ 106 may be applied across an input port 108—which may comprise positive input port 108a and negative input port 108b. Output current $I_L$ 102 may be supplied to an output port 110 and may flow from positive output port 110a through load 104 into negative output port 110b. When system 100 is implemented in a chip scale package—such as chip scale package 200 shown in FIGS. 2A and 2B—positive input port 108a may be provided at a pin 208 through an electrical connection to positive input port 108a on a chip inside the chip scale package. Pin 208 may be formed as a solder bump as shown in FIGS. 2A and 2B. Likewise, negative input port 108b may be provided at a pin 209; positive output port 110a may be provided at a pin 210; and negative output port 110b may be provided at a pin 211. Chip scale package 200 may have additional pins 212, as shown, which may be connected to ground. The pins 208-212 may be arranged in a six bump, 0.5 millimeter (mm) pitch (i.e., distance between balls, center-to-center), 0.3 mm (diameter) ball, 2×3 array as shown in FIG. 2B. A typical package size of chip scale package 200, for example, may be approximately 0.9 millimeter in height 214 by 1.05 mm in width 216 by 1.5 mm in length 218.

Returning to FIG. 1, collector current $I_C$ 112 of switching transistor Q1 114 may be supplied via diode D3sh 116, connected between positive input port 108a and the collector of switching transistor Q1 114, when diode D3sh 116 is forward biased (e.g., when a large enough positive voltage is applied across input port 108). Diode D3sh 116 may be a Schottky diode, for example, with a forward biased voltage drop of 0.3 to 0.5 volts (V).

Base current $I_B$ 124 of switching transistor Q1 114 may be supplied from circuit node B by Zener diode D1z 118, resistor R1 120, and resistor R2 122, which may act to bias or switch switching transistor Q1 114 on or off, depending on the value of input voltage $V_{IN}$ 106. Zener diode D1z 118, resistor R1 120, and resistor R2 122 may be connected in series as shown from positive input port 108a to negative output port 110b (circuit node C). The base of switching transistor Q1 114 may be connected between resistor R1 120 and resistor R2 122 at circuit node B. It should be noted that the connection of resistor R2 122 at negative output port 110b, as shown in FIG. 1, may be identical with circuit node C. It should also be noted that FIG. 1 follows a standard circuit diagram convention that electrical connection is indicated by a dot where lines cross and absence of a dot indicates that there is no electrical connection where the lines cross. So, for example, FIG. 1 indicates that positive output port 110a is not connected at circuit node B nor at resistor R2 122. Zener diode D1z 118 may be rated, for example, at $V_Z$=6.6V (Zener reverse bias breakdown voltage), $I_Z$=5 milliamps (mA), and $R_Z$=80 ohms. Resistor R1 120 may have a value, for example, of 850 ohms, and resistor R2 122 may have a value, for example, of 12,000 ohms, or 12 K ohms. The node B currents may be current $I_1$ 126, which may pass through Zener diode D1z 118 and resistor R1 120; current $I_2$ 128, which may pass through resistor R2 122; and switching transistor Q1 base current $I_B$ 124.

Emitter current $I_E$ 130 of switching transistor Q1 114 may flow into circuit node E. Circuit node E may be connected to the emitter of switching transistor Q1 114, to positive output port 110, to resistor R4 132, and to Zener diode D3z 134, which may connected in series with a second Zener diode D2z 136, for example, to increase the Zener voltage drop between circuit node E and circuit node C. Zener diodes D3z 134 and D2z 136, like Zener diode D1z 118, may be rated, for example, at $V_Z$=6.6V, $I_Z$=5 mA, and $R_Z$=80 ohms. Resistor R4 132 may have a value, for example, of 2.2 K ohms. The node E currents may be Zener diode current $I_Z$ 138, which may pass through Zener diodes D3z 134 and D2z 136; current $I_4$ 140, which may pass through resistor R4 132; switching transistor Q1 emitter current $I_E$ 130; and output current $I_L$ 102.

Diode transistors Q2, Q3, Q4, and Q5 142 may be connected in series between positive input port 108a and circuit node D, where a terminal one of them, e.g., diode transistor Q2, may be connected to resistor R4 132 and resistor R5 144. The base of each of diode transistors Q2, Q3, Q4, and Q5 142 may be connected to its respective collector so that each of diode transistors Q2, Q3, Q4, and Q5 142 may operate as a diode. When input voltage $V_{IN}$ 106 is sufficiently large across input port 108 and positive at positive input port 108a, diode transistors Q2, Q3, Q4, and Q5 142 may be forward biased so that diode transistor current $I_{Q2}$ 146 may flow with a voltage drop of approximately 0.7 V across each diode transistor. Resistor R5 144 may be connected at circuit node D to resistor R4 132 and series-connected diode transistors Q2, Q3, Q4, and Q5 142. Resistor R5 144 may be connected between circuit node D and circuit node C and may provide a path for current $I_5$ 148 to circuit node C. Resistor R5 144 may have a value, for example, of 100 K ohms. The node D currents may be current $I_{Q2}$ 146, which may pass through series-connected diode transistors Q2, Q3, Q4, and Q5 142; current $I_4$ 140, which may pass through resistor R4 132; and current $I_5$ 148, which may pass through resistor R5 144.

System 100 may also include trimming components used for adjusting the load current, e.g., output current $I_{LOAD}$ 102, during the chip scale package wafer manufacturing process, which may be use to implement system 100 in a chip scale package—such as chip scale package 200. Trimming components may include resistor R3 150, resistor R3a 152, resistor R3b 154, transistor $Q_{program}$ 156, and fuse 158, which may be connected as shown in FIG. 1. For example, resistor R3 150 may have a value of 450 ohms, and resistors R3a 152 and R3b 154 may each have a value of 3.4 K ohms. For example, transistor $Q_{program}$ 156 may be used during manufacture of chip scale package 200 to selectively either "blow" or not "blow" fuse 158 in order to adjust the parameter values of the trimming components to compensate for variations and manufacturing tolerances of the components and parameters of the chip used to implement system 100 in a chip scale package 200. Various means for providing and using trimming components may be known in the art.

For the purpose of explaining the operation and circuit analysis of system 100, the trimming components may be safely ignored and negative input port 108b may be considered as being directly connected at circuit node C. The operating parameters for switching transistor Q1 114 and diode transistors Q2, Q3, Q4, and Q5 142 may be chosen—for example, by adjusting the area occupied by each component on the surface of the chip when implementing system 100 as a chip scale package such as chip scale package 102—so that collector current $I_C$ 112 is 10 times diode transistor current $I_{Q2}$ 146. For the example used to illustrate one embodiment, as illustrated by FIG. 1, current $I_C$ 112 may be taken nominally to be 5 mA. When the circuit and devices are conducting under normal operating conditions, then base current $I_B$ 124 may be calculated as $I_C/\beta$=5 mA/100 so $$I_B = 0.05 \text{ mA} \quad (1)$$

where $\beta$, having a typical value of about 100, is the current gain parameter of switching transistor Q1 114.

The voltage drop from circuit node E to circuit node C, $V_{EC}$ may be regulated by Zener diodes D3z 134 and D2z 136, which may act as a shunt regulator that regulates the applied current (e.g., output current $I_L$ 102) into the load 104. For example, with Zener diodes D3z 134 and D2z 136 each rated at 6.6 V then $$V_{EC} = 13.2 \text{ V} \quad (2).$$

The voltage at circuit node D, $V_D$ may be determined from input voltage $V_{IN}$ 106 according to the voltage drop across series connected diode transistors Q2, Q3, Q4, and Q5 142 when input voltage $V_{IN}$ 106 varies, for example, in a range from about 8.4 V to 28.0 V, so $$V_D = V_{IN} - 4(0.7) = V_{IN} - 2.8 \quad (3).$$

The voltage drop across resistor R2 122, $V_{R2}$ is the sum of the voltage from circuit node B to circuit node E, $V_{BE}$, and the voltage from circuit node E to circuit node C, $V_{EC}$, but $V_{BE}$ may be approximated as the base to emitter voltage drop of switching transistor Q1 114, e.g., approximately 0.7 V, so $$V_{R2} = V_{BE} + V_{EC} = 0.7 + 13.2 = 13.9 \text{ V} \quad (4).$$

Thus, using Ohm's law to calculate current $I_2$ 128 using the exemplary value of 12 K ohms for resistor R2 122, $$I_2 = V_{R2}/R2 = 13.9/12 \text{ K} = 1.16 \text{ mA} \quad (5).$$

Current $I_1$ 126 may be calculated by summing the node B currents to zero, so $$I_1 = I_2 + I_B = 1.16 + 0.05 = 1.21 \text{ mA} \quad (6).$$

The voltage drop across resistor R1 120, $V_{R1}$ may be calculated from Ohm's law using the exemplary value of 850 ohms for resistor R1 120, $$V_{R1} = I_1 \times R1 = 1.21 \times 10^{-3} \times 850 = 1.028 \text{ V} \quad (7).$$

Thus, the voltage at circuit node B, $V_B$ may be determined from input voltage $V_{IN}$ 106 according to the voltage drop across resistor R1 120 and the voltage drop $V_{Z1}$ across Zener diode D1z 118 using the exemplary value, 6.6 V, of the rated voltage of Zener diode D1z 118, so that $$V_B = V_{IN} - V_{R1} - V_{Z1} = V_{IN} - 1.028 - 6.6 = V_{IN} - 7.628 \quad (8).$$

The voltage at circuit node E, $V_E$ differs from the voltage at circuit node B, $V_B$, by the voltage drop from circuit node B to circuit node E, $V_{BE}$, thus $$V_E = V_B - V_{BE} = V_{IN} - 7.628 - 0.7 = V_{IN} - 8.328 \quad (9).$$

Equations (3), (8), and (9) show that the voltage at circuit nodes D, B, and E, respectively, may be determined by the amount of the input voltage $V_{IN}$ 106 and not affected (within practical limits) by the parameters, e.g., resistance, of the load 104.

Continuing with FIG. 1, the voltage drop $V_{R4}$ across resistor R4 132, connected between circuit nodes D and E, may be the voltage drop from circuit node D to circuit node E, $V_{DE}$, which by definition may be $V_D - V_E$. Thus, $$V_{R4} = V_{DE} = V_D - V_E = (V_{IN} - 2.8) - (V_{IN} - 8.328) = 5.528 \text{ V} \quad (10).$$

Then, using Ohm's law to calculate current $I_4$ 140, using the exemplary value of 2.2 K ohms for resistor R4 132, $$I_4 = V_{R4}/R4 = 5.528/2.2 \text{ K} = 2.51 \text{ mA} \tag{11}$$

Using a loop equation (e.g., voltage drops around a closed loop circuit sum to zero) for circuit nodes E, D, and C shows that $V_{EC} = V_{ED} + V_{DC}$, so $$V_{DC} = V_{EC} - V_{ED} = V_{EC} - (-V_{DE}) = 13.2 + 5.528 = 18.728 \text{ V} \tag{12}$$

The voltage drop $V_{R5}$ across resistor R5 144, connected between circuit nodes D and C, may be the voltage drop from circuit node D to circuit node C, by definition $V_{DC}$, so $V_{R5} = V_{DC} = 18.728$ V. Then, using Ohm's law to calculate current $I_5$ 148, using the exemplary value of 100 K ohms for resistor R5 144, the value of current $I_5$ 148 may be given approximately as $$I_5 = V_{R5}/R5 = 18.728/100 \text{ K} = 0.187 \text{ mA} \tag{13}$$

Diode transistor current $I_{Q2}$ 146 may be calculated by summing the node D currents to zero, so $$I_{Q2} = I_4 + I_5 = 2.51 + 0.187 = 2.697 \text{ mA} \tag{14}$$

By definition, $V_{DC} = V_D - V_C$ so $$V_C = V_D - V_{DC} = (V_{IN} - 2.8) - 18.728 = V_{IN} - 21.528 \tag{15}$$

Applying a node equation (e.g., the sum of currents into a node equals the sum of currents out of the node) at circuit node E to the node E currents: Zener diode current $I_Z$ 138; current $I_4$ 140; switching transistor Q1 emitter current $I_E$ 130; and output current $I_L$ 102 yields $I_E + I_4 = I_Z + I_L$ so that $$I_L = I_E + I_4 - I_Z \tag{16}$$

Equation (16) shows that current (e.g., output current $I_L$ 102) may be provided to load 104 by switching transistor Q1 114 while excess current may be shunted around the load, for example, by Zener diodes D3z 134 and D2z 136, so that a proper amount of output current $I_L$ 102 may be provided to the load depending on the load 104 resistance $R_L$ and input voltage $V_{IN}$ 106.

For a switching transistor such as Q1 114, it is generally known that the emitter current $I_E$ and collector current $I_C$ may be related as $I_E = I_C/\alpha$, and that for a transistor having a typical current gain parameter β of about 100, α=100/101, so that $I_E$ is approximately equal $I_C$. For example, with the exemplary nominal value of current $I_C$ 112 of 5 mA, and exemplary value of base current $I_B$ 124 of 0.05 mA (see Equation (1)) emitter current $I_E$ 130 may have an exemplary value of 5.05 mA. Thus, Equation (16) may be rewritten $$I_L = I_C + I_4 - I_Z \tag{17}$$

Neglecting the values of the trimming components and assuming that $V_C = 0$ (e.g., that $V_C$ equals the voltage at negative input port 108b or, equivalently, that input voltage $V_{IN}$ 106 may be applied across positive input port 108a and node C), and relating the output current $I_L$ 102, the voltage $V_L$ 160, and the resistance $R_L$ of load 104, (and using Equations (10) and (3)) then $$*I_L = V_L/R_L = V_E/R_L = (-V_{R4} + V_D)/R_L = (-5.528 + (V_{IN} - 2.8))/R_L \tag{18}$$

Assuming, for the sake of example, that $R_L = 540$ ohms, then $$I_L = (V_{IN} - 8.328)/540 \tag{19}$$

Equation (19) indicates, for example, that output current $I_L$ 102 of system 100 may be controlled by the applied input voltage $V_{IN}$ 106.

Figure 3:
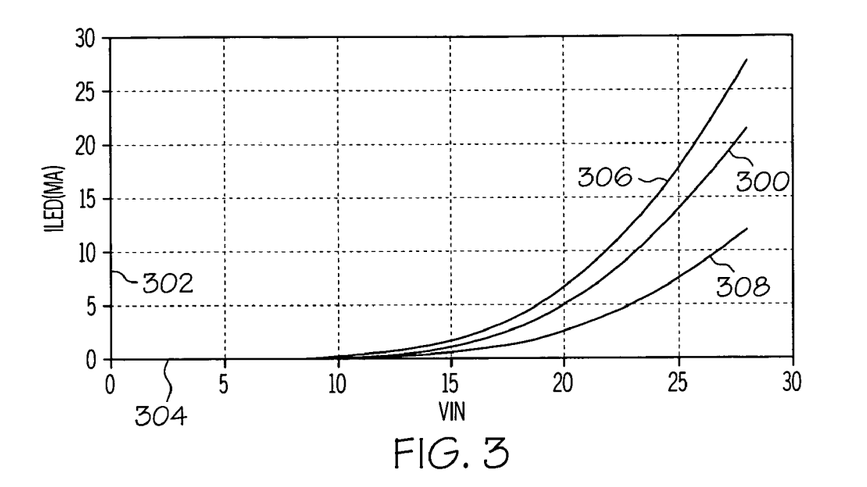
FIG. 3 is a graph showing design, upper, and lower performance curves for LED current relative to input voltage to a transistorized, voltage-controlled dimming circuit in accordance with one embodiment of the present invention.

An example of operation of one embodiment of a system 100, which may be implemented in a chip scale package such as chip scale package 200, is illustrated in FIG. 3. FIG. 3 shows LED current (ILED) versus applied voltage on controlled output current curve 300. Controlled output current curve 300 may show, for example, values of output current $I_L$ 102, on vertical axis 302, provided to an LED load 104 for corresponding values of the input voltage $V_{IN}$ 106, on horizontal axis 304, applied at the input port 108 of a system 100. Curve 306 represents a typical specified upper performance limit for the normalized LED current parameter and the curve 308 represents a typical specified lower performance limit for the same parameter. Curves 306 and 308 may be transposed onto FIG. 3, for example, to set and illustrate the performance requirement boundaries for normalized ILED versus variable input voltage applied to the CSP chip. The controlled output current curve 300 may be the normalized CSP design performance curve for dimming the LEDs from a variable voltage source—such as system 100. It should be noted that all three curves 300, 306, 308 may be plotted on the same coordinate system to graphically demonstrate the boundary requirements for the CSP performance values of controlled output current curve 300 so that the curve 300 of the controlled output current versus input voltage matches the luminance of a light emitting diode (e.g., load 104) to a curve of the luminance of an incandescent lamp versus the input voltage (e.g., for the same voltage as input voltage $V_{IN}$ 106). Curve 306 may show the allowable upper boundary performance curve, and curve 308 may show the allowable lower boundary performance curve that may indicate, for example, variations in output of system 100 due, for example, to normal manufacturing variations in component values or variations in operating temperature. The normalized controlled output current curve 300 may be composed of two segments, the first beginning at approximately 8.5 Volts direct current (VDC) where the resultant LED current (e.g., output current $I_L$ 102) may be approximately 2.0 microamps and ending at approximately 18 VDC where the resultant LED current may be approximately 2.2 mA, and the second beginning at approximately 18 VDC where the resultant LED current may be approximately 2.2 mA and ending at approximately 28 VDC where the resultant LED current may be approximately 20±2 mA.

Figure 4:
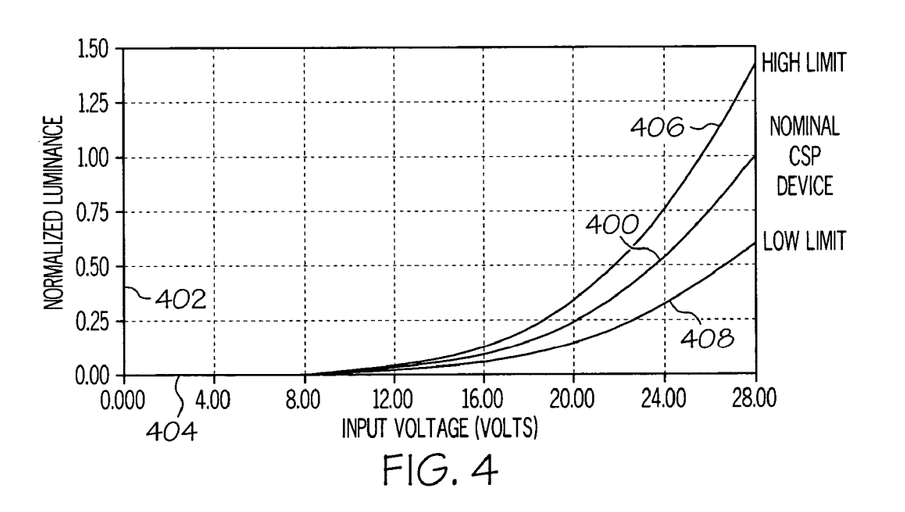
FIG. 4 is a normalized graph showing luminance curves for an LED driven by a transistorized, voltage-controlled dimming circuit in accordance with one embodiment of the present invention.

Another example of operation of an embodiment of a system 100, which may also be implemented in a chip scale package such as chip scale package 200, is illustrated in FIG. 4 by LED normalized luminance curve 400. The LED normalized luminance curve 400 (also referred to as the "dimmed luminance curve" or the "controlled luminance curve") may show, for example, the values of normalized luminance on vertical axis 402 corresponding to the values of the normalized input voltage on horizontal axis 404 for an LED light source. For example, the LED light source may be connected as load 104 and the input voltage may be an input voltage $V_{IN}$ 106, applied across the input port 108 of a system 100. In general, the LED luminance output is directly proportional to its input current (e.g., output current $I_L$ 102 is the input current of LED load 104). Curve 406 shows a high limit normalized curve of LED luminance for approximating the normalized luminance of a comparable incandescent light and, similarly, curve 408 shows a low limit normalized curve of LED luminance for approximating the luminance of a comparable incandescent light. The curves 406, 408 of FIG. 4 may be the transposed simulation of the characteristics of an LED. The curves 406 (upper boundary limit) and 408 (lower boundary limit) may be the transposed normalized luminance versus applied voltage. Curves 406 and 408 may be transposed onto FIG. 4 to set and illustrate the performance requirement boundaries of normalized luminance of LEDs versus the voltage applied to the CSP chip. The LED normalized luminance curve 400 may be the simulated normalized performance curve for dimming the LEDs from a variable voltage source—such as system 100. It should be noted that all three curves 400, 406, 408 may be plotted on the same coordinate system to graphically demonstrate the boundary requirements for the nominal performance values of dimmed luminance curve 400 so that the shape of the dimmed luminance curve of the light emitting diode matches the shape of the dimmed luminance curve of an incandescent light when the input voltage is within a specified range of values. Curve 400 thus indicates the normalized luminance matching of an LED to incandescent lighting over a range of input voltages (e.g., input voltage $V_{IN}$ 106), for example, between zero and 30 V and, more specifically, within a range between about 8.5 and 28 V.

Figure 5:
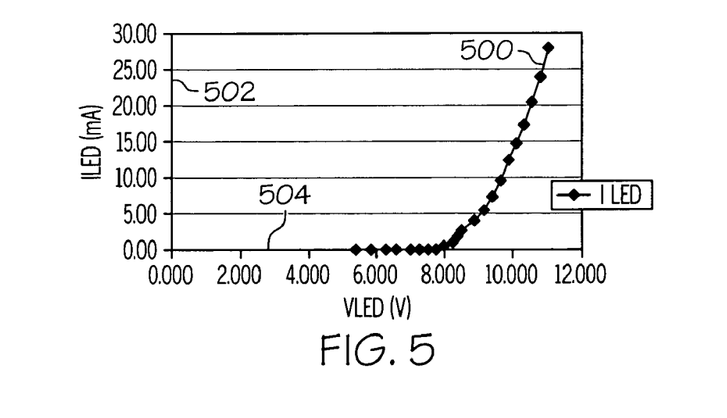
FIG. 5 is a graph obtained from Spice (Simulation Program with Integrated Circuit Emphasis) model simulation, showing current for three series-connected LEDs relative to the load voltage ($V_L$) to the LEDs supplied by a transistorized, voltage-controlled dimming circuit in accordance with one embodiment of the present invention.

A further example of operation of an embodiment of a system 100, which may also be implemented in a chip scale package such as chip scale package 200, is illustrated in FIG. 5 by the controlled LED current curve 500. The controlled LED current curve 500 shows the Spice (Simulation Program with Integrated Circuit Emphasis) model simulation results where the values of the load current (Iled) are plotted on the vertical axis 502 for corresponding values of the input voltage on horizontal axis 504. For example, the load current may be supplied as output current $I_L$ 102 from a system 100; the load may be an LED load 104 connected to system 100; and the input voltage may be an input voltage $V_{IN}$ 106 applied at the input port 108 of system 100. In this example, the load 104 may comprise an array of three LEDs connected in series. As shown, the output current $I_L$ 102 to the load 104 array of three LEDs connected in series may be suitable for the LED array when driven by system 100 to approximate the luminance of an incandescent light.

Figure 6:
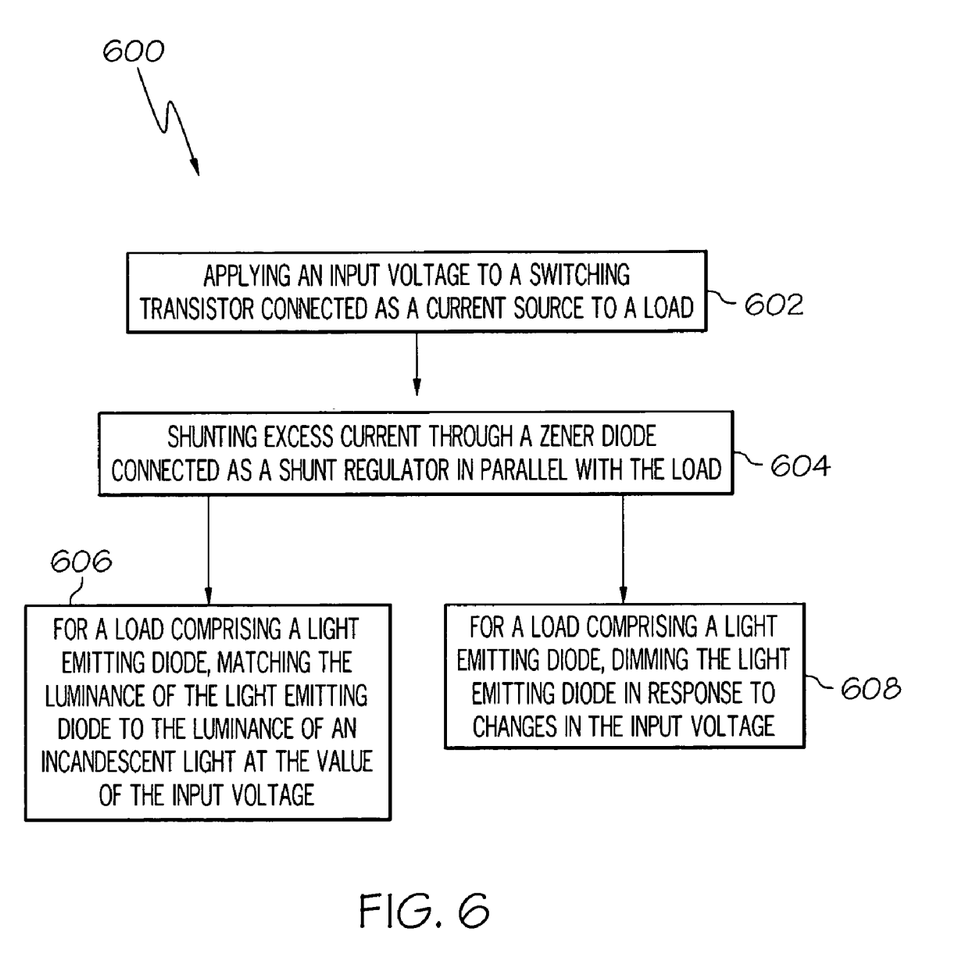
FIG. 6 is a flowchart of a method for voltage-controlled power regulation of an electrical load in accordance with one embodiment of the present invention.

FIG. 6 illustrates method 600 for voltage-controlled power regulation of an electrical load in accordance with one embodiment of the present invention. Operation 602 may include applying an input voltage such as input voltage $V_{IN}$ 106 to a switching transistor such as switching transistor Q1 114 in the circuit configuration of system 100. Switching transistor Q1 114 may be connected as a current source to a load such as load 104. In other words, an output current— such as output current $I_L$ 102—may be provided from a circuit node that is maintained at stable voltage relative to the input voltage—such as circuit node E of system 100, to which the emitter of switching transistor Q1 114 may be connected. Operation 604 may include shunting excess current through a Zener diode connected as a shunt regulator in parallel with the load. For example, Zener diodes D3z 134 and D2z 136 may be connected at a circuit node E that supplies the output current $I_L$ 102 to the load, and Equation (16) shows that the currents into and out of the node, including the output current $I_L$ 102 and the Zener diode current $I_Z$ 138, are balanced to maintain the voltage, e.g., voltage $V_E$, at the circuit node E. Operation 606 may include providing one or more light emitting diodes in the load 104 and matching the luminance of the one or more light emitting diodes to the luminance of an incandescent light for various values of the input voltage as shown, for example, in FIG. 4. System 100 may also be used, as at operation 608, for dimming of one or more light emitting diodes (in a load 104) in response to changes in the input voltage (e.g., input voltage $V_{IN}$ 106) as illustrated, for example, by FIGS. 3 and 5.

It should be understood, of course, that the foregoing relates to exemplary embodiments of the invention and that modifications may be made without departing from the spirit and scope of the invention as set forth in the following claims.

We claim:

1. A system comprising:
    a switching transistor activated by an input voltage and connected as a current source to a load;
    at least one Zener diode connected as a shunt regulator in parallel with the load; and
    at least one diode transistor, said diode transistor having a base and collector with the base connected to the collector, wherein said diode transistor is connected in parallel with the switching transistor between the input voltage and an output current.

2. The system of claim 1, wherein:
    the load comprises at least one light emitting diode and the shape of the dimmed luminance curve of the light emitting diode matches the shape of the dimmed luminance curve of an incandescent light when the input voltage is within a specified range of values.

3. The system of claim 1, wherein:
    the load comprises at least one light emitting diode and the light emitting diode is dimmed in response to changes in the input voltage.

4. The system of claim 1, further comprising:
    at least one Zener diode connected between the input voltage and the base of said switching transistor and acting to bias said switching transistor.

5. A voltage-controlled power regulation circuit comprising:
    a switching transistor activated by an input voltage;
    at least one Zener diode connected to the switching transistor; and
    at least one diode transistor having a base and a collector with the base connected to the collector, wherein
    the diode transistor is connected in parallel with said switching transistor between the input voltage and the output current,
    the switching transistor is connected in series with the load and provides an output current to a load, and
    the Zener diode is connected in parallel with the load and regulates the current to the load.

6. The voltage-controlled power regulation circuit of claim 5, further comprising:
    at least one Zener diode connected between the input voltage and the base of said switching transistor and providing a base current to switch said switching transistor.

7. The voltage-controlled power regulation circuit of claim 5, further comprising:
    a Schottky diode connected between the input voltage and the collector of the switching transistor.

8. The voltage-controlled power regulation circuit of claim 5, wherein:
    the load comprises at least one light emitting diode having a luminance; and
    a curve of the controlled output current versus input voltage matches the luminance of the light emitting diode to a curve of the luminance of an incandescent lamp versus input voltage.

9. A voltage-controlled luminance matching circuit comprising:
    an input port having a positive input port and a negative input port;
    an output port having a positive output port and a negative output port;

at least one diode transistor, having a base and a collector with the base connected to the collector, and connected between said positive input port and said positive output port;

a switching transistor connected between said positive input port and said positive output port;

a Zener diode connected between said positive input port and the base of said switching transistor; and at least one Zener diode connected between said positive output port and said negative output port; and also connected between said positive output port and said negative input port.

10. The voltage-controlled luminance matching circuit of claim 9, wherein:

an input voltage $V_{IN}$ is applied across said input port;

said at least one diode transistor is connected at a circuit node D; and a voltage at said circuit node D is determined by the input voltage $V_{IN}$.

11. The voltage-controlled luminance matching circuit of claim 9, wherein:

an input voltage $V_{IN}$ is applied across said input port;

said switching transistor is connected at a circuit node E and said positive output port is connected at said circuit node E; and a voltage at said circuit node E is determined by the input voltage $V_{IN}$.

12. The voltage-controlled luminance matching circuit of claim 9, wherein:

an input voltage $V_{IN}$ is applied across said input port;

the base of said switching transistor is connected at a circuit node B; and a voltage at said circuit node B is determined by the input voltage $V_{IN}$.

13. The voltage-controlled luminance matching circuit of claim 9, wherein:

an input voltage $V_{IN}$ is applied across said input port;

at least one light emitting diode is connected across said output port; and the controlled luminance of said at least one light emitting diode matches the controlled luminance of an incandescent lamp at the value of the input voltage $V_{IN}$.

14. A chip scale package comprising:

an input port pin;

an output port pin;

a switching transistor having a collector, emitter, and base, wherein:

the input port pin is connected to apply a first voltage to the collector of the switching transistor when an input voltage $V_{IN}$ is applied at the input port pin;

the input port pin is connected to apply a base current to the base of the switching transistor when the input voltage $V_{IN}$ is applied at the input port pin; and the emitter of the switching transistor is connected to the output port pin; and at least one Zener diode connected at the output port pin as a shunt regulator in parallel with a load connected externally to the chip scale package at the output port pin.

15. The chip scale package of claim 14, further comprising:

at least one diode transistor connected at the input port pin, said diode transistor determining a voltage relative to the input voltage $V_{IN}$ at a circuit node when the input voltage $V_{IN}$ is applied at the input port pin.

16. The chip scale package of claim 14, further comprising:

at least one trimming component connected to compensate variations in component values of said chip scale package.

17. A method comprising the steps of:

applying an input voltage to a switching transistor connected as a current source to a load;

connecting at least one diode transistor in parallel with said switching transistor between an input voltage and an output current; said diode transistor having a base and a collector with the base connected to the collector; and shunting excess current through a Zener diode connected as a shunt regulator in parallel with the load.

18. The method of claim 17, wherein the load comprises at least one light emitting diode and further comprising the step of:

matching the controlled luminance of the light emitting diode to the controlled luminance of an incandescent light at the value of the input voltage.

19. The method of claim 17, wherein the load comprises at least one light emitting diode and further comprising the step of:

dimming the light emitting diode in response to changes in the input voltage.

20. The method of claim 17, further comprising the step of:

applying the input voltage to a diode transistor connected to operate as a diode to determine a first voltage relative to the input voltage at a circuit node connected via a resistor to the switching transistor and the Zener diode.

21. A method for voltage-controlled power regulation, comprising:

applying an input voltage $V_{IN}$ so that a first voltage is applied at the collector of a switching transistor, and a voltage-controlled luminance circuit;

said voltage-controlled luminance circuit comprising an input port having a positive input port and a negative input port and an output port having a positive output port and a negative output port, at least one diode transistor having a base and a collector with the base connected to the collector, and a switching transistor connected between said positive input port and said positive output port;

said base and said collector further connected between said positive input port and said positive output port;

applying the input voltage $V_{IN}$ so that a base current is supplied to the base of the switching transistor;

providing an emitter current from the switching transistor to a circuit node E;

shunting current from the circuit node E through at least one Zener diode, said Zener diode connected between said positive input port and the base of said switching transistor; and providing current from the circuit node E to a load.

22. The method of claim 21, further comprising the steps of:

applying the input voltage $V_{IN}$ to at least one diode transistor so that a first voltage is determined relative to the input voltage $V_{IN}$ at a circuit node D; and providing a current from the circuit node D to the circuit node E.

23. The method of claim 21, wherein the step of providing current to a load further comprises the steps of:

providing current to at least one light emitting diode;

matching the controlled luminance of the light emitting diode to the controlled luminance of an incandescent lamp at the input voltage $V_{IN}$.

* * * * *